US009170774B2

(12) United States Patent
Hecht et al.

(10) Patent No.: US 9,170,774 B2
(45) Date of Patent: Oct. 27, 2015

(54) FAST CARRY LOOKAHEAD CIRCUITS

(75) Inventors: Volker Hecht, Barshinghausen (DE);
Marcel Derevlean, Barshinghausen (DE); Jonathan Greene, Palo Alto, CA (US)

(73) Assignee: Microsemi SoC Corporation, San Jose, CA (US)

( * ) Notice: Subject to any disclaimer, the term of this patent is extended or adjusted under 35 U.S.C. 154(b) by 267 days.

(21) Appl. No.: 13/494,850

(22) Filed: Jun. 12, 2012

(65) Prior Publication Data

US 2012/0259908 A1  Oct. 11, 2012

Related U.S. Application Data

(63) Continuation of application No. 12/022,721, filed on Jan. 30, 2008, now Pat. No. 8,244,791.

(51) Int. Cl.
*G06F 7/508* (2006.01)
(52) U.S. Cl.
CPC ...................... *G06F 7/508* (2013.01)
(58) Field of Classification Search
USPC ................... 708/505, 670, 706–714
See application file for complete search history.

(56) References Cited

U.S. PATENT DOCUMENTS

| 5,276,635 | A | * | 1/1994 | Naini et al. | 708/713 |
| 6,154,053 | A | * | 11/2000 | New | 326/41 |
| 7,003,545 | B1 | * | 2/2006 | Mohammed et al. | 708/711 |
| 7,685,215 | B1 | * | 3/2010 | Gaide et al. | 708/235 |
| 7,743,085 | B2 | * | 6/2010 | Schmit et al. | 708/710 |
| 7,872,497 | B2 | * | 1/2011 | Plants | 326/38 |
| 2007/0244958 | A1 | * | 10/2007 | Redgrave | 708/700 |

OTHER PUBLICATIONS

D. A. Patterson and J. L. Hennessy, "Computer Organization and Design: The Hardware/Software Interface," third edition, Elsevier/Morgan Kaufmann, 2005.*
Cormen, T. et al., Introduction to Algorithms, p. 662, The MIT Press, 1990.
T. Cormen et al., Introduction to Algorithms, 3rd Ed., p. 662, The MIT Press, 2009.

* cited by examiner

*Primary Examiner* — Chuong D Ngo
*Assistant Examiner* — Matthew Sandifer
(74) *Attorney, Agent, or Firm* — Leech Tishman Fuscaldo & Lampl; Kenneth D'Alessandro, Esq.

(57) ABSTRACT

A fast lookahead carry adder includes adder logic and lookahead carry-path logic coupled to the adder logic. The carry path logic has a main carry path, a carry entrance path and a carry exit path, the carry entrance path separate from the carry exit path.

3 Claims, 5 Drawing Sheets

FAST CARRY LOOKAHEAD CIRCUITS

CROSS-REFERENCE TO RELATED APPLICATIONS

The present application is a continuation and claims the priority benefit of U.S. patent application Ser. No. 12/022,721 filed Jan. 30, 2008 and entitled "Fast Carry Lookahead Circuits," the disclosure of which is incorporated herein by reference.

BACKGROUND OF THE INVENTION

1. Field of the Invention

The present invention relates to digital logic circuits. More particularly, the present invention relates to arithmetic logic circuits and to fast lookahead carry circuits.

2. The Prior Art

Adder circuits include provision for producing and propagating a carry bit. A single bit stage of a prior-art ripple-carry adder is shown in FIG. 1. Input terms "a" and "b" are presented on input lines 10 and 12 to XOR gate 14. The "b" input on line 12 is also presented to the "0" input of multiplexer 16. A carry input (ci) on line 18 is presented to the "1" data input of multiplexer 16. The output of XOR gate 14 produces a term px that is used to drive the select input of multiplexer 16. The output of multiplexer 16 is the carry output of the adder presented on carry-out line (co) 20. The px term and the ci input (shown as the cx input) are presented to XOR gate 22. The output term of the adder is presented on line 24 at the output of XOR gate 22. The carry chain is the portion of the circuit of FIG. 1 contained within the dashed lines 26 of FIG. 1.

Different prior-art adder types use the same logic to create the carry-propagate signal px for a bit x as well as the carry input signal ux, and the XOR gate 22 to create the sum output(s) from the propagate signal px and the local carry output signal cx.

FIGS. 2-8 focus on alternative implementations of the carry-chain logic between ci, px and ux inputs and co and cx outputs of the carry chain, contained within the dashed lines 26 of FIG. 1, in order to compare the prior art with the present invention. FIGS. 2-8 show different examples of multi-bit adders.

FIG. 2 is a schematic diagram of a carry chain of a prior-art 2-bit wide ripple-carry adder. The carry-input signal u0 for bit 0 is presented on line 30 to the "0" input of multiplexer 32. The carry-in signal ci is presented on line 34 to the "1" input of multiplexer 32. The propagate signal p0 for bit 0 is presented on line 36 to the select input of multiplexer 32.

The carry-input signal u1 for bit 1 is presented on line 38 to the "0" input of multiplexer 40. The output of multiplexer 32 is presented to the "1" input of multiplexer 40. The propagate signal p1 for bit 1 is presented on line 42 to the select input of multiplexer 40. The output of multiplexer 40 is buffered by buffer 44 to produce the carry-out (co) signal on line 46. The carry-in signal on line 34 is buffered by buffer 48 to produce the local carry-out signal c0 on line 50. The output of multiplexer 32 is buffered by buffer 52 to produce the local carry-out signal c1 on line 54.

The buffer 44 at the carry output is optional and could alternatively be an inverter, creating an inverted carry-output and it can be placed after any number of multiplexers to optimize speed. The other buffers 48 and 52 are also optional, and serve to limit the capacitive load on the main carry path.

Referring now to FIG. 3, a schematic diagram shows only the carry chain of a prior-art 2-bit wide carry-lookahead-adder. The carry-input signal u0 for bit 0 is presented on line 60 to the "0" input of multiplexer 62. The carry-in signal ci is presented on line 64 to the "1" input of multiplexer 62. The propagate signal p0 for bit 0 is presented on line 66 to the select input of multiplexer 62.

The carry-input signal u1 for bit 1 is presented on line 68 to the "0" input of multiplexer 70. The output of multiplexer 62 is presented to the "1" input of multiplexer 70. The propagate signal p1 for bit 1 is presented on line 72 to the select input of multiplexer 70. The output of multiplexer 70 is buffered by buffer 74.

The output of buffer 74 is presented to the "0" input of multiplexer 76. The carry-in input ci is presented to the "1" input of multiplexer 76. The propagate signals p0 and p1 are combined in AND gate 78. The output of AND gate 78 is presented to the select input of multiplexer 76. The output of multiplexer 76 is buffered by buffer 80 to produce the carry-out (co) signal on line 82. The carry-in signal on line 64 is buffered by buffer 84 to produce the local carry-out c0 signal on line 86. The output of multiplexer 62 is buffered by buffer 88 to produce the local carry-out c1 signal on line 90. Buffers 74, 80, 84, and 88 are optional and buffers 80, 84, and 88 could also be inverters without having to invert any of the signals.

If both propagate signals p0 and p1 within the basic lookahead-unit (2 bits wide in this example) are logic "1," the carry-input of the entire stage gets propagated to the co output on line 82 by multiplexer 76.

Referring now to FIG. 4, a schematic diagram shows only the carry chain of a prior-art 3-bit wide carry-lookahead-adder. The carry-input signal u0 for bit 0 is presented on line 100 to the "0" input of multiplexer 102. The carry-in signal ci is presented on line 104 to the "1" input of multiplexer 102. The propagate signal p0 for bit 0 is presented on line 106 to the select input of multiplexer 102.

The carry-input signal u1 for bit 1 is presented on line 108 to the "0" input of multiplexer 110. The output of multiplexer 102 is presented to the "1" input of multiplexer 110. The propagate signal p1 for bit 1 is presented on line 112 to the select input of multiplexer 110.

The carry-input signal u2 for bit 2 is presented on line 114 to the "0" input of multiplexer 116. The output of multiplexer 110 is presented to the "1" input of multiplexer 116. The propagate signal p2 for bit 2 is presented on line 118 to the select input of multiplexer 116. The output of multiplexer 116 is buffered by buffer 120.

The output of buffer 120 is presented to the "0" input of multiplexer 122. The carry-in input ci is presented to the "1" input of multiplexer 122. The propagate signals p0, p1, and p2 are combined in AND gate 124. The output of AND gate 124 is presented to the select input of multiplexer 122. The output of multiplexer 122 is buffered by buffer 126 to produce the carry-out (co) signal on line 128. The carry-in signal on line 104 is buffered by buffer 130 to produce the local carry-out signal c0 on line 132. The output of multiplexer 102 is buffered by buffer 134 to produce the local carry-out c1 signal on line 136. The output of multiplexer 110 is buffered by buffer 138 to produce the local carry-out c2 signal on line 140. Buffers 120, 126, 130 134, and 138 are optional and buffers 126, 130, 134, and 138 could also be inverters without having to invert any of the signals.

In a manner similar to the operation of the carry chain of the 2-bit wide carry-lookahead-adder of FIG. 3, if all three propagate signals p0, p1, and p2 within the basic lookahead-unit are logic "1," the carry-input of the entire stage gets propagated to the co output on line 128 by multiplexer 122.

BRIEF DESCRIPTION

The present invention reduces the delay of carry-lookahead adders through the main carry-path, as well as the entrance path and the exit path. A fast lookahead carry adder includes adder logic and lookahead carry-path logic coupled to the adder logic. The carry path logic has a carry entrance path and a carry exit path, the carry entrance path separate from the carry exit path.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

The terms carry-entrance path, carry-exit path and main carry path are used herein. As used herein, the carry-entrance path extends from the u0 input to the co output; the carry-exit path extends from input ci to the local carry-out c0-cx outputs, where x is the most significant bit. The main carry path extends from the ci input to the co output.

Figure 5:
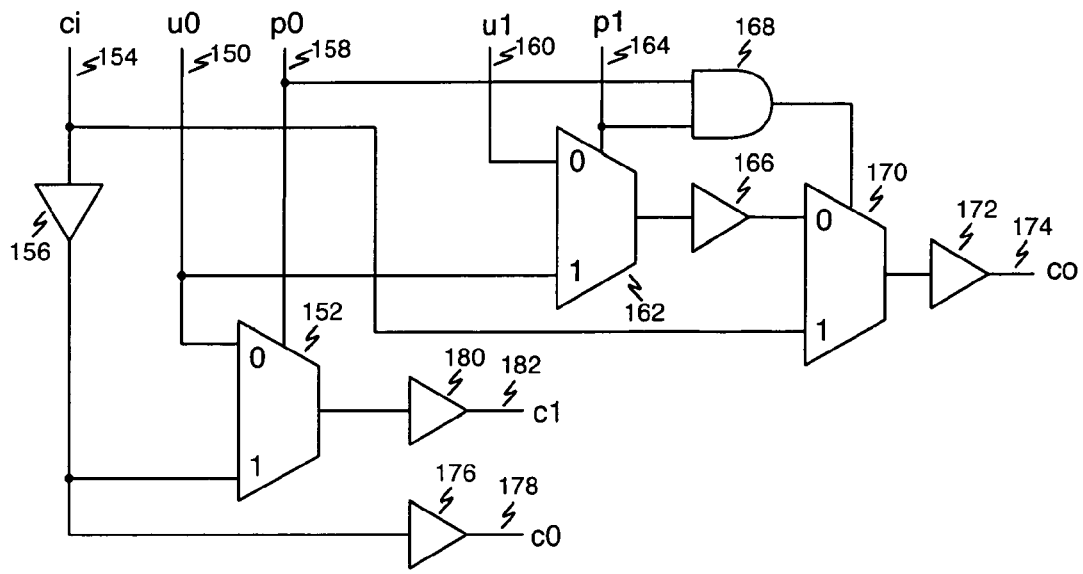
FIG. 5 is a schematic diagram showing an illustrative example of a 2-bit wide carry lookahead adder with a separate carry entrance and exit path according to the present invention.

Referring now to FIG. 5, a schematic diagram shows an illustrative example of a carry path for a 2-bit wide carry lookahead adder having separate carry-entrance and carry-exit paths according to the present invention.

The carry-input signal u0 for bit 0 is presented on line 150 to the "0" input of multiplexer 152. The carry-in signal ci is presented on line 154 through buffer 156 to the "1" input of multiplexer 152. The propagate signal p0 for bit 0 is presented on line 158 to the select input of multiplexer 152.

The carry-input signal u1 for bit 1 is presented on line 160 to the "0" input of multiplexer 162. The u0 input on line 150 is presented to the "1" input of multiplexer 162. The propagate signal p1 for bit 1 is presented on line 164 to the select input of multiplexer 162. The output of multiplexer 162 is buffered by buffer 166.

The output of buffer 166 is presented to the "0" input of multiplexer 170. The carry-in (ci) input on line 154 is presented to the "1" input of multiplexer 170. The propagate signals p0 and p1 are combined in AND gate 168. The output of AND gate 168 is presented to the select input of multiplexer 170. The output of multiplexer 170 is buffered by buffer 172 to produce the carry-out (co) signal on line 174. The buffered carry-in signal is buffered by buffer 176 to produce the local carry-out c0 signal on line 178. The output of multiplexer 152 is buffered by buffer 180 to produce the local carry-out c1 signal on line 182. Buffers 156, 166, 172, 176 and 180 are optional or could be replaced by inverters by changing the polarities of some signals to compensate for the inversion.

Figure 1:
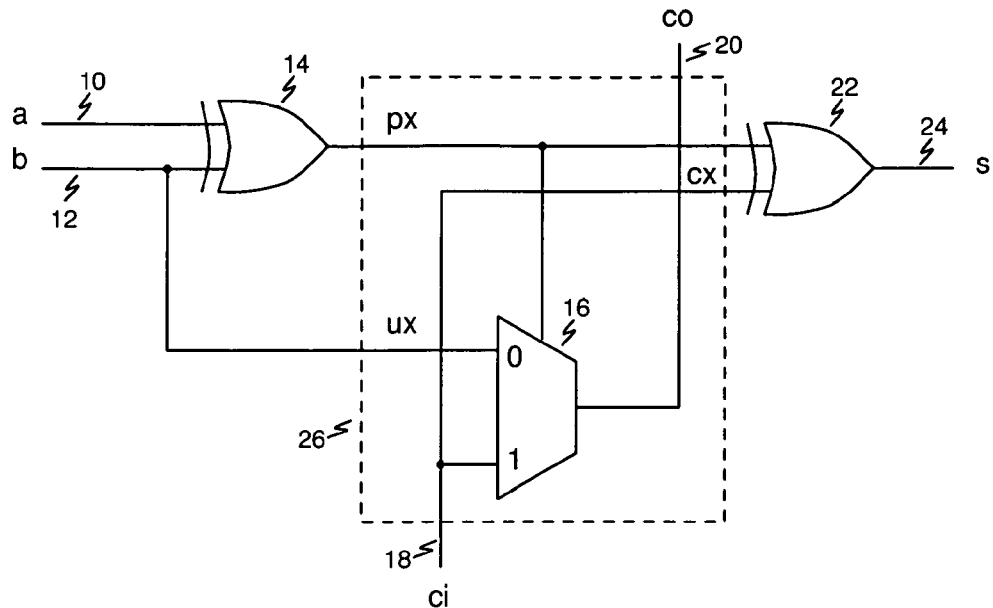
FIG. 1 is a schematic diagram of a prior-art ripple-carry adder.
Figure 2:
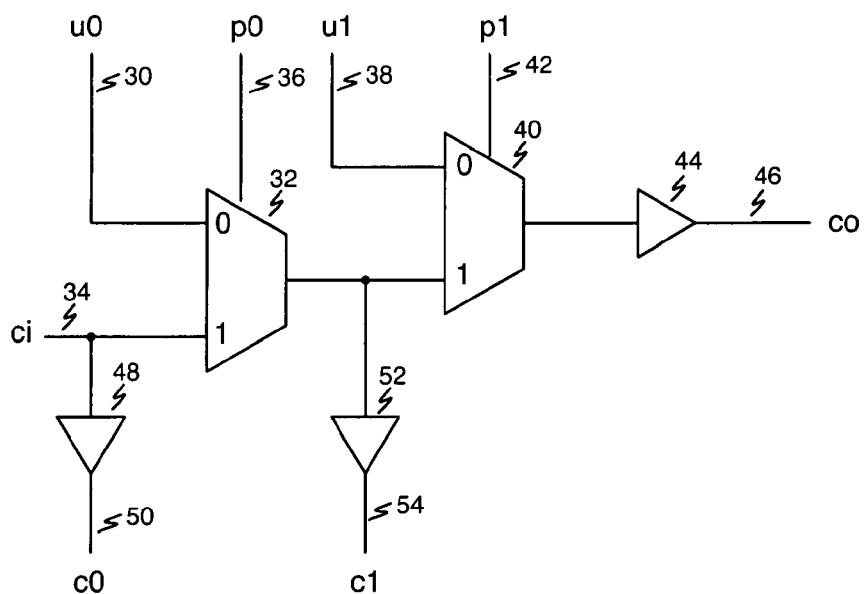
FIG. 2 is a schematic diagram showing only the carry chain of a prior-art 2-bit wide ripple-carry adder
Figure 3:
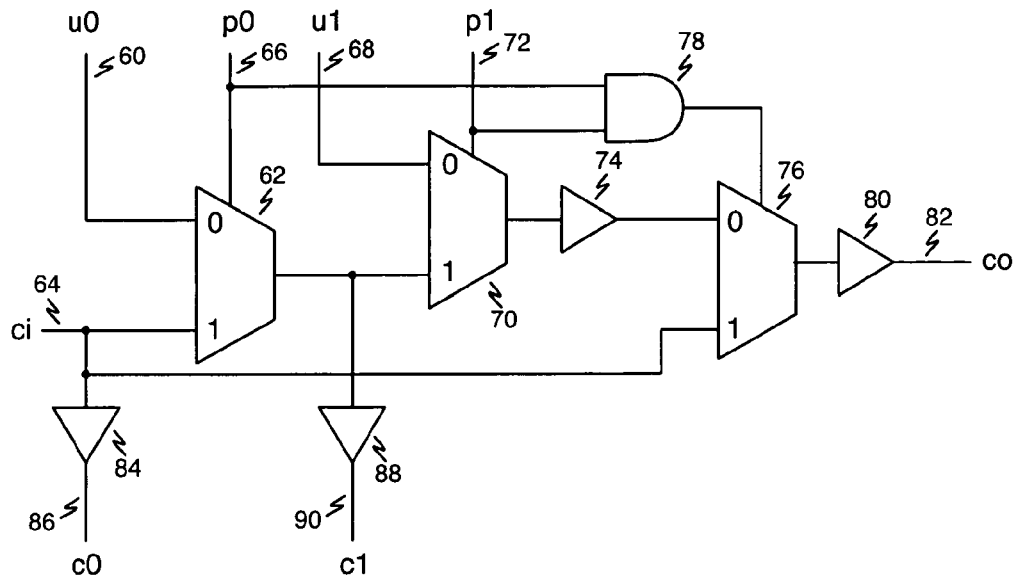
FIG. 3 is a schematic diagram showing only the carry chain of a prior-art 2-bit wide carry-lookahead-adder.

As may be seen from a comparison of the carry paths of FIGS. 3 and 5, the carry-exit path from ci to local carry outputs c0 and c1 is entirely separate from the carry-entrance path from u0 to co. In addition, the use of buffer 156, formed using small geometry devices, to isolate the remainder of the carry: exit path from the ci input reduces the capacitive loading on the ci node. By splitting the carry-entrance and carry-exit paths, the longest carry-entrance path from u0 to co is through multiplexers 162 and 170, as compared with the longest carry-entrance path from u0 to co in FIG. 3 through multiplexers 62, 70, and 76. The present invention thus reduces the carry entrance path by one multiplexer, which shortens the propagation delay through the carry chain. By locating multiplexer 152 in the carry-exit path downstream from buffer 156 the capacitive load on the ci input is reduced, thus speeding up the main carry path.

Figure 6:
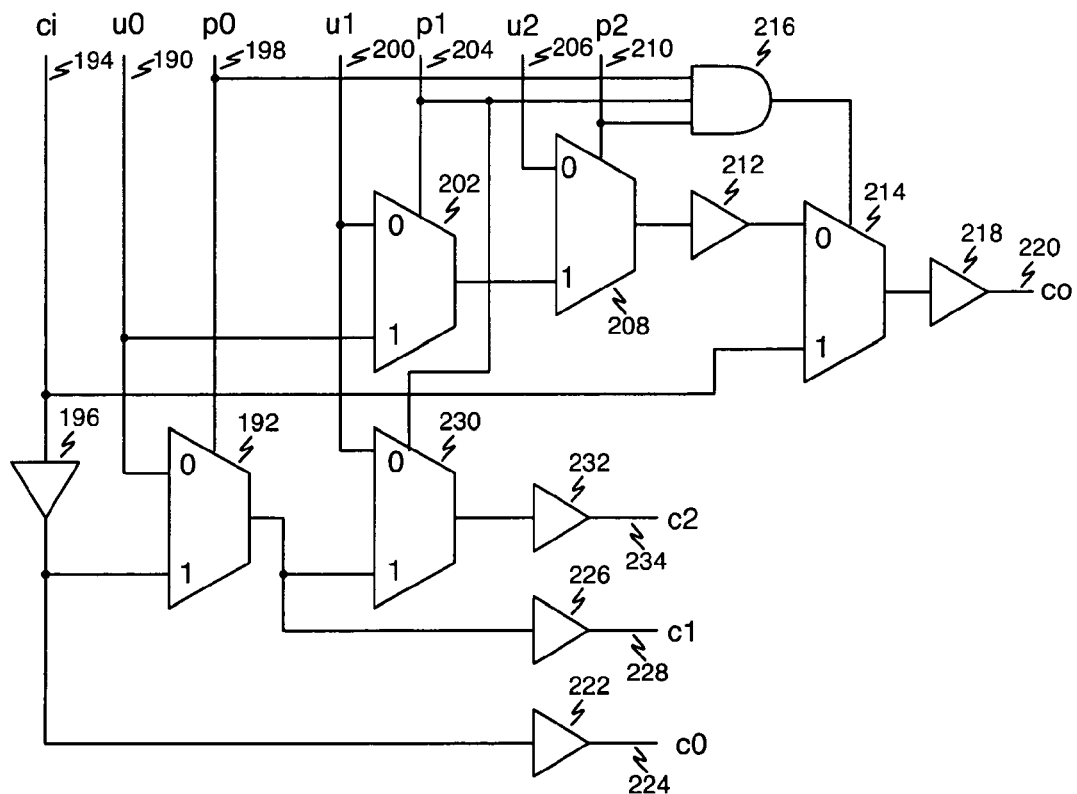
FIG. 6 is a schematic diagram showing an illustrative example of a 3-bit wide carry lookahead adder with a separate carry entrance and exit path according to the present invention.

Referring now to FIG. 6, a schematic diagram shows an illustrative example of a carry path for a 3-bit wide carry lookahead adder having separate carry entrance and exit paths according to another embodiment of the present invention. The carry-input signal u0 for bit 0 is presented on line 190 to the "0" input of multiplexer 192. The carry-in signal ci is presented on line 194 through buffer 196 to the "1" input of multiplexer 192. The propagate signal p0 for bit 0 is presented on line 198 to the select input of multiplexer 192.

The carry-input signal u1 for bit 1 is presented on line 200 to the "0" input of multiplexer 202. The u0 input on line 190 is presented to the "1" input of multiplexer 202. The propagate signal p1 for bit 1 is presented on line 204 to the select input of multiplexer 202.

The carry-input signal u2 for bit 2 is presented on line 206 to the "0" input of multiplexer 208. The output of multiplexer 202 is presented to the "1" input of multiplexer 208. The propagate signal p2 for bit 2 is presented on line 210 to the select input of multiplexer 208. The output of multiplexer 208 is buffered by buffer 212.

The output of buffer 212 is presented to the "0" input of multiplexer 214. The unbuffered carry-in signal (ci) on line 192 is presented to the "1" input of multiplexer 214. The propagate signals p0, p1, and p2 are combined in AND gate 216. The output of AND gate 216 is presented to the select input of multiplexer 214. The output of multiplexer 214 is buffered by buffer 218 to produce the carry-out (co) signal on line 220. The buffered carry-in signal is buffered by buffer 222 to produce the local carry-out c0 signal on line 224. The output of multiplexer 192 is buffered by buffer 226 to produce the local carry-out c1 signal on line 228. The u1 input on line 200 is presented to the "0" input of multiplexer 230. The output of multiplexer 192 is presented to the "0" input of multiplexer 230. The select input of multiplexer 230 is driven by the p1 signal on line 204. The output of multiplexer 230 is buffered by buffer 232 to produce the local carry-out c2 signal on line 234. Buffers 196, 212, 218, 222, 226, and 232, are optional or could be replaced by inverters by changing the polarities of some signals to compensate for the inversion.

Figure 4:
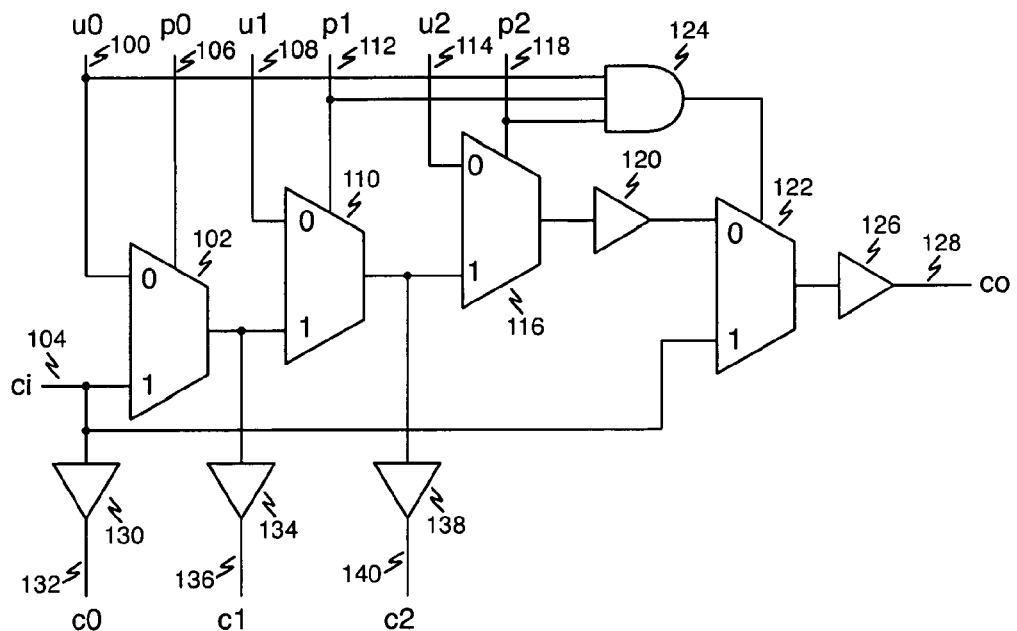
FIG. 4 is a schematic diagram showing only the carry chain of a prior-art 3-bit wide carry-lookahead-adder.

As in the embodiment of FIG. 5, the carry-exit path from ci to local carry outputs c0, c1, and c2 is entirely separate from the carry-entrance path from u0 to ci. In addition, the use of buffer 196, formed using small geometry devices, to isolate the remainder of the carry exit path from the ci input reduces the capacitive loading on the ci node. As may be seen by comparing FIGS. 4 and 6 with FIGS. 3 and 5, enlarging the basic unit width by one more bit will increase the length of the delay paths in both the carry-entrance and exit paths by one more multiplexer. The longest carry-entrance path from u0 to co in FIG. 6 is through multiplexers 202, 208, and 214, as compared with the longest carry-entrance path from u0 to co in FIG. 3 through multiplexers 102, 110, 116, and 122. Again, the present invention reduces this path by one multiplexer, which shortens the propagation delay through the carry chain. The adder shown in FIG. 6 expanded to a width of 4 bits would have four multiplexers in the entrance-path as well as in the exit-path.

Figure 7:
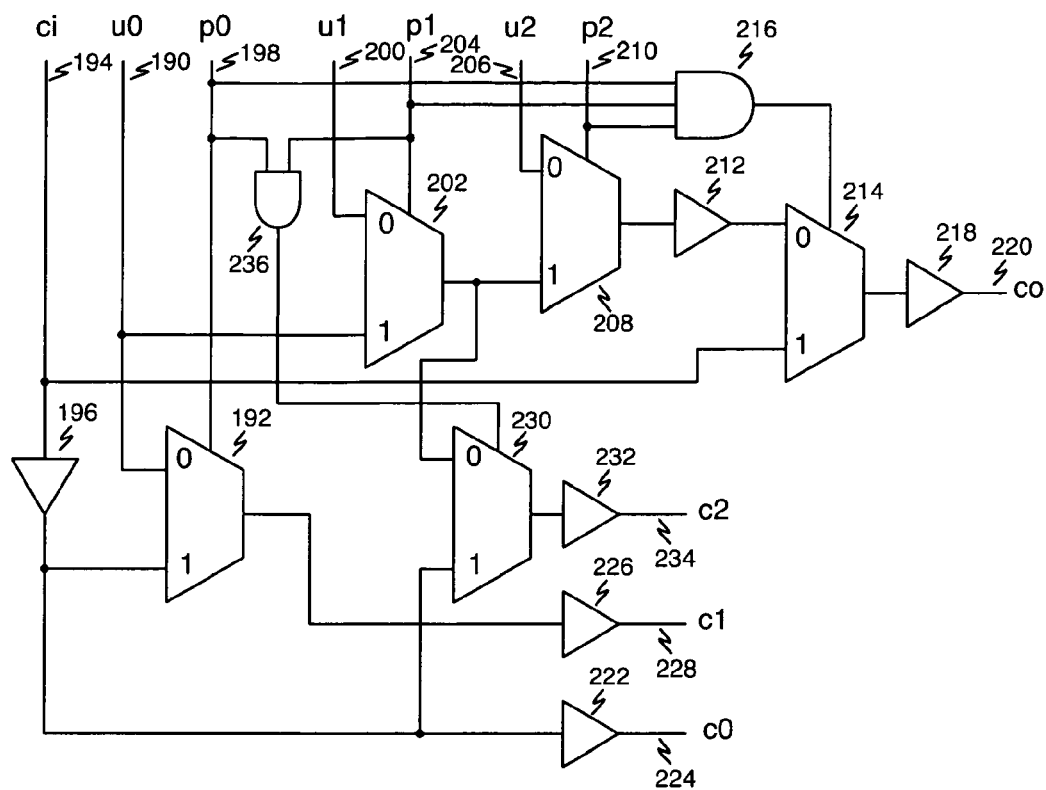
FIG. 7 is a schematic diagram showing another illustrative example of a 3-bit wide carry lookahead adder with a separate carry entrance and exit path according to the present invention.

Referring now to FIG. 7, a schematic diagram shows another illustrative example of a carry path for a 3-bit wide carry lookahead adder having separate carry entrance and exit paths according to another embodiment of the present invention. The embodiment of FIG. 7 is similar to the one shown in FIG. 6, and corresponding elements in FIGS. 6 and 7 will be identified by like reference numerals.

The carry-input signal u0 for bit 0 is presented on line 190 to the "0" input of multiplexer 192. The carry-in signal ci is presented on line 194 through buffer 196 to the "1" input of multiplexer 192. The propagate signal p0 for bit 0 is presented on line 198 to the select input of multiplexer 192.

The carry-input signal u1 for bit 1 is presented on line 200 to the "0" input of multiplexer 202. The u0 input on line 190 is presented to the "1" input of multiplexer 202. The propagate signal p1 for bit 1 is presented on line 204 to the select input of multiplexer 202.

The carry-input signal u2 for bit 2 is presented on line 206 to the "0" input of multiplexer 208. The output of multiplexer 202 is presented to the "1" input of multiplexer 208. The propagate signal p2 for bit 2 is presented on line 210 to the select input of multiplexer 208. The output of multiplexer 208 is buffered by buffer 212.

The output of buffer 212 is presented to the "0" input of multiplexer 214. The unbuffered carry-in signal (ci) on line 192 is presented to the "1" input of multiplexer 214. The propagate signals p0, p1, and p2 are combined in AND gate 216. The output of AND gate 216 is presented to the select input of multiplexer 214. The output of multiplexer 214 is buffered by buffer 218 to produce the carry-out (co) signal on line 220. The buffered carry-in signal is buffered by buffer 222 to produce the local carry-out c0 signal on line 224. The output of multiplexer 192 is buffered by buffer 226 to produce the local carry-out c1 signal on line 228. The u1 input on line 200 is presented to the "0" input of multiplexer 230. The ci input on line 194 buffered by buffer 196 is presented to the "1" input of multiplexer 230. The p0 and p1 signals on lines 198 and 204 are combined in AND gate 232. The output of AND gate 232 drives the select input of multiplexer 230. The output of multiplexer 230 is buffered by buffer 234 to produce the local carry-out c2 signal on line 236. Buffers 196, 212, 218, 222, 226, and 234, are optional or could be replaced by inverters by changing the polarities of some signals to compensate for the inversion.

As in the embodiments of FIGS. 5 and 6, the carry-exit path in the embodiment of FIG. 7 from ci to local carry outputs c0, c1, and c2 is entirely separate from the carry-entrance path from u0 to ci. In addition, the use of buffer 196, formed using small geometry devices, to isolate the remainder of the carry exit path from the ci input reduces the capacitive loading on the ci node. As in the embodiments of FIGS. 5 and 6, enlarging the basic unit width by one more bit will increase the length of the delay paths in both the carry-entrance and exit paths by one more multiplexer. The longest carry-entrance path from u0 to co in FIG. 7 is through multiplexers 202, 208, and 214, as compared with the longest carry-entrance path from u0 to co in FIG. 3 through multiplexers 102, 110, 116, and 122. Again, the present invention reduces this path by one multiplexer, which shortens the propagation delay through the carry chain.

According to another aspect of the invention, shown in FIG. 7, to which attention is now drawn, a hierarchical approach is used to reduce the number of multiplexers in the entrance path to three and in the exit path to two, even for the 4-bit width shown.

Figure 8:
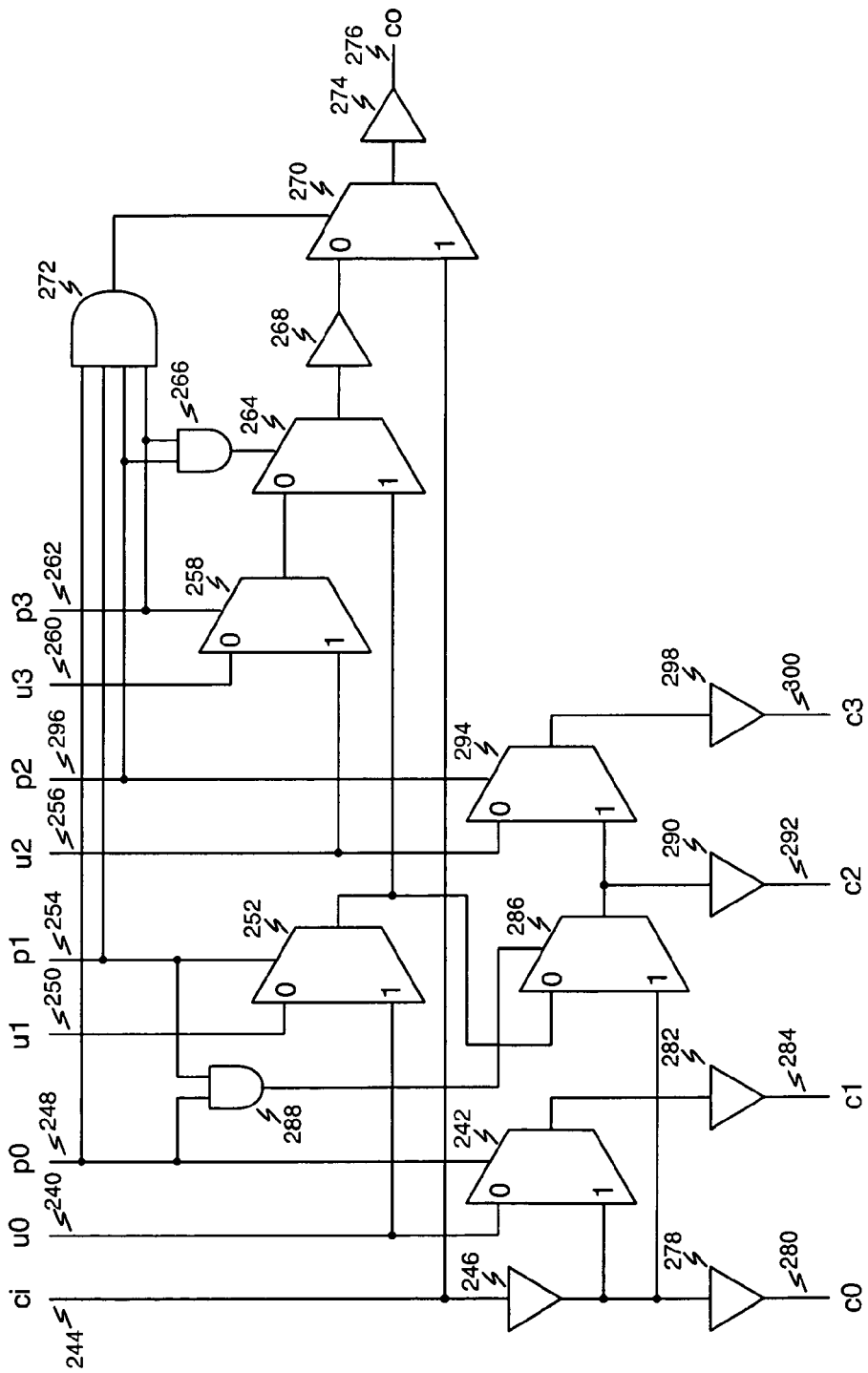
FIG. 8 is a schematic diagram showing an illustrative example of the use of a hierarchical approach in a 4-bit wide carry lookahead adder to reduce the number of multiplexers in the entrance and exit paths, even for the 4-bit width.

Referring now to FIG. 8, a schematic diagram shows an illustrative example of a carry path using a hierarchical approach for a 4-bit wide carry lookahead adder having separate carry entrance and exit paths according to the present invention. The carry-input signal u0 for bit 0 is presented on line 240 to the "0" input of multiplexer 242. The carry-in signal ci is presented on line 244 through buffer 246 to the "1" input of multiplexer 242. The propagate signal p0 for bit 0 is presented on line 248 to the select input of multiplexer 242.

The carry-input signal u1 for bit 1 is presented on line 250 to the "0" input of multiplexer 252. The u0 input on line 240 is presented to the "1" input of multiplexer 252. The propagate signal p1 for bit 1 is presented on line 254 to the select input of multiplexer 252.

The carry-input signal u2 for bit 2 is presented on line 256 to the "1" input of multiplexer 258. The carry-input signal u3 for bit 3 is presented on line 260 to the "0" input of multiplexer 258. The propagate signal p3 for bit 3 is presented on line 262 to the select input of multiplexer 258.

The output of multiplexer 258 is presented to the "0" input of multiplexer 264. The output of multiplexer 252 is presented to the "1" input of multiplexer 264. The p2 and p3 signals are combined in AND gate 266. The output of AND gate 266 is presented to the select input of multiplexer 264. The output of multiplexer 264 is buffered by buffer 268.

The output of buffer 268 is presented to the "0" input of multiplexer 270. The unbuffered carry-in signal (ci) on line 244 is presented to the "1" input of multiplexer 270. The propagate signals p0, p1, p2, and p3 are combined in AND gate 272. The output of AND gate 272 is presented to the select input of multiplexer 270. The output of multiplexer 270 is buffered by buffer 274 to produce the carry-out (co) signal on line 276.

The buffered carry-in signal is buffered by buffer 278 to produce the local carry-out c0 signal on line 280. The output of multiplexer 242 is buffered by buffer 282 to produce the local carry-out c1 signal on line 284. The output of multiplexer 252 is presented to the "0" input of multiplexer 286. The buffered carry-in signal is presented to the "1" input of multiplexer 286. The p0 and p1 signals are combined in AND gate 288. The output of AND gate 288 is presented to the select input of multiplexer 286. The output of multiplexer 286 is buffered by buffer 290 to produce the local carry-out c2 signal on line 292. The carry-input signal u2 for bit 2 is presented on line 256 to the "0" input of multiplexer 294. The output of multiplexer 286 is presented to the "1" input of multiplexer 294. The p2 signal on line 296 is presented to the select input of multiplexer 294. The output of multiplexer 294 is buffered by buffer 298 to produce the local carry-out c3 signal on line 300. Buffers 246, 268, 274, 278, 282, 290, and 298 are optional or could be replaced by inverters by changing the polarities of some signals to compensate for the inversion.

The hierarchical approach of FIG. 8 has several advantages. The number of multiplexers in the entrance path is reduced to three and in the number of multiplexers in the exit path is reduced to two, even for the 4-bit width shown. The embodiment of FIGS. 6 and 7 expanded to four bits would require four multiplexers in the entrance path. The prior-art example of FIG. 4 expanded to four bits would require five multiplexers in the entrance path. The embodiment of FIG. 6 expanded to four bits would require three multiplexers in the exit path. The prior-art example of FIG. 4 expanded to four bits would require three multiplexers in the exit path. The hierarchical approach thus also saves multiplexers in the exit path.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A carry lookahead circuit for a fast carry adder comprising:
   a carry-in signal node;
   first, second, and third carry-input signal nodes; first, second, and third propagate signal nodes;
   first, second, and third local carry-out signal nodes;
   a carry-out signal node;
   a first buffer having an input and an output, the input coupled to the carry-in signal node and the output coupled to the first local carry-out signal node;
   a first multiplexer having a first data input coupled to the first carry-input signal node, a second data input coupled to the output of the first buffer, a control input coupled to the first propagate signal node, and an output coupled to the second local carry-out signal node;
   a second multiplexer having a first data input coupled to the second carry-input signal node, a second data input coupled to the first carry-input signal node, a control input coupled to the second propagate signal node, and an output;
   a third multiplexer having a first data input coupled to the third carry-input signal node, a second data input coupled to the output of the second multiplexer, and a control input coupled to the third propagate input signal node, and an output;
   an AND gate having a first input coupled to the first propagate signal node, a second input coupled to the second propagate signal node, a third input coupled to the third propagate signal node' and an output;
   a fourth multiplexer having a first data input coupled to the output of the third multiplexer, a second data input coupled to the carry-in signal node, a control input coupled to the output of the AND gate, and an output coupled to the carry-out signal node;
   a fifth multiplexer having a first data input coupled to the second carry-input signal node, a second data input coupled to the output of the first multiplexer, a control input coupled to the second propagate signal node, and an output coupled to the third local carry-out signal node; and
   wherein the output of the first buffer is coupled to the first local carry-out signal node through a second buffer, the output of the first multiplexer is coupled to the second local carry-out signal node through a third buffer, the output of the fifth multiplexer is coupled to the third local carry-out signal node through a fourth buffer, and
   wherein the first buffer is smaller than each of the second, third, and fourth buffers.

2. The carry lookahead circuit of claim 1, wherein the output of the fourth multiplexer is coupled to the carry-out signal node through a buffer.

3. The carry lookahead circuit of claim 1, wherein the output of the third multiplexer is coupled to the first data input of the fourth multiplexer through a buffer.

* * * * *